(12) United States Patent
Lee et al.

(10) Patent No.: US 11,495,234 B2
(45) Date of Patent: Nov. 8, 2022

(54) DATA MINING APPARATUS, METHOD AND SYSTEM FOR SPEECH RECOGNITION USING THE SAME

(71) Applicant: LG Electronics Inc., Seoul (KR)

(72) Inventors: Jee Hye Lee, Seoul (KR); Seon Yeong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/497,309

(22) PCT Filed: May 30, 2019

(86) PCT No.: PCT/KR2019/006508
§ 371 (c)(1),
(2) Date: Sep. 24, 2019

(87) PCT Pub. No.: WO2019/172734
PCT Pub. Date: Sep. 12, 2019

(65) Prior Publication Data
US 2022/0076683 A1   Mar. 10, 2022

(51) Int. Cl.
*G10L 15/30* (2013.01)
*G10L 15/02* (2006.01)
(Continued)

(52) U.S. Cl.
CPC .............. *G10L 15/30* (2013.01); *G10L 15/02* (2013.01); *G10L 15/063* (2013.01); *G10L 15/14* (2013.01);
(Continued)

(58) Field of Classification Search
CPC ....... G10L 15/30; G10L 15/02; G10L 15/063; G10L 15/14; G10L 15/16; G10L 2015/0631
See application file for complete search history.

(56) References Cited

U.S. PATENT DOCUMENTS

2012/0259627 A1* 10/2012 Willett ................. G10L 15/142
704/E15.001
2013/0080161 A1* 3/2013 Iwata ..................... G16H 20/40
704/E15.001
(Continued)

FOREIGN PATENT DOCUMENTS

KR   101179915   9/2012
KR   101836430   3/2018
(Continued)

OTHER PUBLICATIONS

Beringer et al., "German Regional Variants—A Problem for Automatic Speech Recognition?" ICSLP, 1998 (Year: 1998).*
(Continued)

*Primary Examiner* — Bhavesh M Mehta
*Assistant Examiner* — Edward Tracy, Jr.
(74) *Attorney, Agent, or Firm* — Fish & Richardson P.C.

(57) ABSTRACT

A data mining device, and a speech recognition method and system using the same are disclosed. The speech recognition method includes selecting speech data including a dialect from speech data, analyzing and refining the speech data including a dialect, and learning an acoustic model and a language model through an artificial intelligence (AI) algorithm using the refined speech data including a dialect. The user is able to use a dialect speech recognition service which is improved using services such as eMBB, URLLC, or mMTC of 5G mobile communications.

16 Claims, 6 Drawing Sheets

(51) Int. Cl.
  *G10L 15/06* (2013.01)
  *G10L 15/14* (2006.01)
  *G10L 15/16* (2006.01)
(52) U.S. Cl.
  CPC ...... *G10L 15/16* (2013.01); *G10L 2015/0631* (2013.01)

(56) References Cited

U.S. PATENT DOCUMENTS

| | | |
|---|---|---|
| 2016/0284344 A1 | 9/2016 | Su et al. |
| 2018/0308470 A1* | 10/2018 | Park ........................ G10L 15/063 |
| 2019/0304457 A1* | 10/2019 | Nakano .................... G10L 15/24 |
| 2020/0193985 A1* | 6/2020 | Lee .......................... G10L 15/22 |

FOREIGN PATENT DOCUMENTS

| | | |
|---|---|---|
| KR | 1020180114781 | 10/2018 |
| KR | 1020180118462 | 10/2018 |

OTHER PUBLICATIONS

Li et al., "Multi-Dialect Speech Recognition With a Single Sequence-to-Sequence Model" IEEE, 2018 (Year: 2018).*

\* cited by examiner

DATA MINING APPARATUS, METHOD AND SYSTEM FOR SPEECH RECOGNITION USING THE SAME

CROSS-REFERENCE TO RELATED APPLICATION

This application is a National Stage application under 35 U.S.C. § 371 of International Application No. PCT/KR2019/006508, filed on May 30, 2019, the entire disclosure of which is incorporated by reference.

TECHNICAL FIELD

The present disclosure relates to a data mining device, and a speech recognition method and system using the same. More particularly, the present disclosure relates to a data mining device for improving a dialect recognition performance and a speech recognition method and system with an improved dialect recognition performance using the same.

BACKGROUND ART

The concept of speech recognition includes the recognition, analysis, and understanding of speech uttered by a person during a conversation between the person and a machine, and various techniques have been used for speech recognition.

The speech recognition process is largely composed of three stages. First, from inputted speech, features of speech actually uttered by a person are extracted. Then, based on the extracted features of the speech, patterns are classified through a similarity measurement with a reference acoustic model. Thereafter, within the classified patterns, by using a reference language model, the features of the speech are processed as a language, and recognized as a final sentence.

Dialects of a language generally refer to variations of that language depending on a region and social factors. Dialects are a valuable cultural heritage having a unique system and history, and showing the diversity of a language. Dialects illustrate both the change and the history of a language in terms of linguistics, and the lives of people in a region, projected onto the language in terms of cultural values. Moreover, dialects are still used by people in a certain regions along with a standard dialect.

Since a speech recognition system recognizing speech uttered in a particular language is created based on the standard dialect of the corresponding language, the capability to recognize a regional dialect, that is, a dialect, is significantly reduced.

When speech including a dialect is inputted, the dialect is replaced with a standard dialect through removal of a tone noise and a phoneme noise of the dialect speech, and the replaced standard dialect is recognized. Such technology is disclosed in Korean Patent Registration No. 10-1836430 (hereinafter referred to as "Related Art 1").

However, Related Art 1 does not disclose a solution for a situation when tones of a standard dialect and a dialect are not distinguished from each other. Moreover, since dialect speech cannot simply be changed to standard dialect speech by only removing a phoneme noise from speech including a dialect, the capability of recognizing dialect speech may be significantly reduced.

In addition, when utterance data of a customer is collected, subjected to speech recognition, and refined to have a consistent form, and a statistical language model is learned using the same, the grammar of the statistical language model of a speech recognition engine is updated. Such data refining technology is disclosed in Korean Patent Registration No. 10-1179915 (hereinafter referred to as "Related Art 2").

However, although Related Art 2 is suitable for generation of a language model in a consistent form such as a standard dialect, it is difficult to be applied to speech recognition in which a non-standard dialect having various forms is included.

SUMMARY OF THE DISCLOSURE

An aspect of the present disclosure is to enable speech recognition of speech including a dialect, which due to the non-standard nature of the dialect has not been easily applied to a statistical language model.

Another aspect of the present disclosure is to enable dialect speech and standard dialect speech to be distinguished from each other, rather than converting the dialect speech into standard dialect speech without being recognized as it is.

Another aspect of the present disclosure is to prevent a situation in which transcription is manually performed by a person for speech data processing, which has conventionally involved the consumption of much time and expense.

In addition, an aspect of the present disclosure is to enable speech recognition which is not delayed due to the presence of dialect speech.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

A speech recognition method according to an embodiment of the present disclosure is performed by a speech recognition system designed for dialect speech recognition.

The speech recognition method may include selecting speech data including a dialect from speech data, analyzing and refining the speech data including a dialect, and learning an acoustic model and a language model using the refined speech data including a dialect.

The speech recognition method according to this embodiment of the present disclosure may further include collecting speech data.

Through the collecting speech data, the speech recognition system may collect speech data of users through the users in a region in which different types of dialects are used, and through various types of speech recognition service domains.

The selecting speech data including a dialect from speech data may include removing an abnormal vocalization from the speech data, adopting the speech data including a dialect using a reliability measurement of the speech data, and obtaining transcription data from the speech data including a dialect.

The analyzing and refining the speech data including a dialect may include extracting features from the speech data including a dialect, performing similar dialect clustering on the speech data including a dialect using the extracted features, extracting a core dialect from a similar dialect cluster, and standardizing a dialect corpus using the extracted core dialect.

Through the extracting features from the speech data including a dialect, the speech recognition system may extract at least one among pronunciation string features, lexical features, domain features, and frequency features of dialect speech.

The domain features may include information on a type of an electronic apparatus providing a speech recognition service for the user, information on a region in which the electronic apparatus is located, and information on an age group of the user of the electronic apparatus.

Through the performing similar dialect clustering, the speech recognition system may measure a degree of similarity between features through weight calculation between features according to an unsupervised learning method, and may cluster a dialect having a high degree of similarity to a threshold.

Through the extracting a core dialect from a similar dialect cluster, the speech recognition system may extract n number of objects having the highest frequency features in a cluster, and may extract a core object through a feature similarity calculation with other objects in the cluster.

Through the standardizing a dialect corpus, the speech recognition system may replace an existing dialect with a core object dialect, and may perform verification through a similarity measurement between an original dialect sentence and a replaced sentence.

A data mining device according to another embodiment of the present disclosure corresponds to a component of a speech recognition system which enables the speech recognition system to recognize dialect speech.

The data mining device may be configured to include a feature extraction module extracting features from speech data including a dialect, a deep learning module performing similar dialect clustering on the speech data including a dialect using the extracted features, a core dialect extraction module extracting a core dialect from a similar dialect cluster, and a corpus standardization module standardizing a dialect corpus using the extracted core dialect.

The feature extraction module may extract at least one among pronunciation string features, lexical features, domain features, and frequency features of dialect speech.

The domain features may include information on a type of an electronic apparatus providing speech recognition service for the user, information on a region in which the electronic apparatus is located, and information on an age group of the user of the electronic apparatus.

The deep learning module may measure a degree of similarity between features through weight calculation between features according to an unsupervised learning method, and may cluster a dialect having a high degree of similarity to a threshold.

The core dialect extraction module may extract n number of objects having the highest frequency features in a cluster, and may extract a core object through a feature similarity calculation with other objects in the cluster.

The corpus standardization module may replace an existing dialect with a core object dialect, and may perform verification through similarity measurement between an original dialect sentence and a replaced sentence.

A speech recognition system according to still another embodiment of the present disclosure includes a data collection module collecting speech data, a speech data selection module selecting speech data including a dialect from collected speech data, a speech data analysis and refinement module analyzing and refining the speech data including a dialect, a model learning module learning an acoustic model and a language model using the refined speech data including a dialect, and a speech recognition engine recognizing speech using the learned acoustic model and the learned language model.

The speech data analysis and refinement module may include a feature extraction module extracting features from speech data including a dialect, a deep learning module performing similar dialect clustering on the speech data including a dialect using the extracted features, a core dialect extraction module extracting a core dialect from a similar dialect cluster, and a corpus standardization module standardizing a dialect corpus using the extracted core dialect.

According to embodiments of the present disclosure, a performance of a speech recognition system recognizing speech including a dialect may be improved.

Further, by enabling speech including a dialect to be recognized as it is, without conversion into a standard dialect, natural language processing of language using a dialect may be performed.

Furthermore, by using artificial intelligence for data mining, data refining may be performed using a semi-automatic method.

In addition, through standardization of a corpus including a dialect, the time consumed in dialect recognition may be reduced.

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

DESCRIPTION OF EMBODIMENTS

Hereinafter, preferred embodiments of a data mining device and a speech recognition method and system using the same will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness. The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art. Subsequently, examples are described in further detail with reference to the accompanying drawings.

Figure 1:
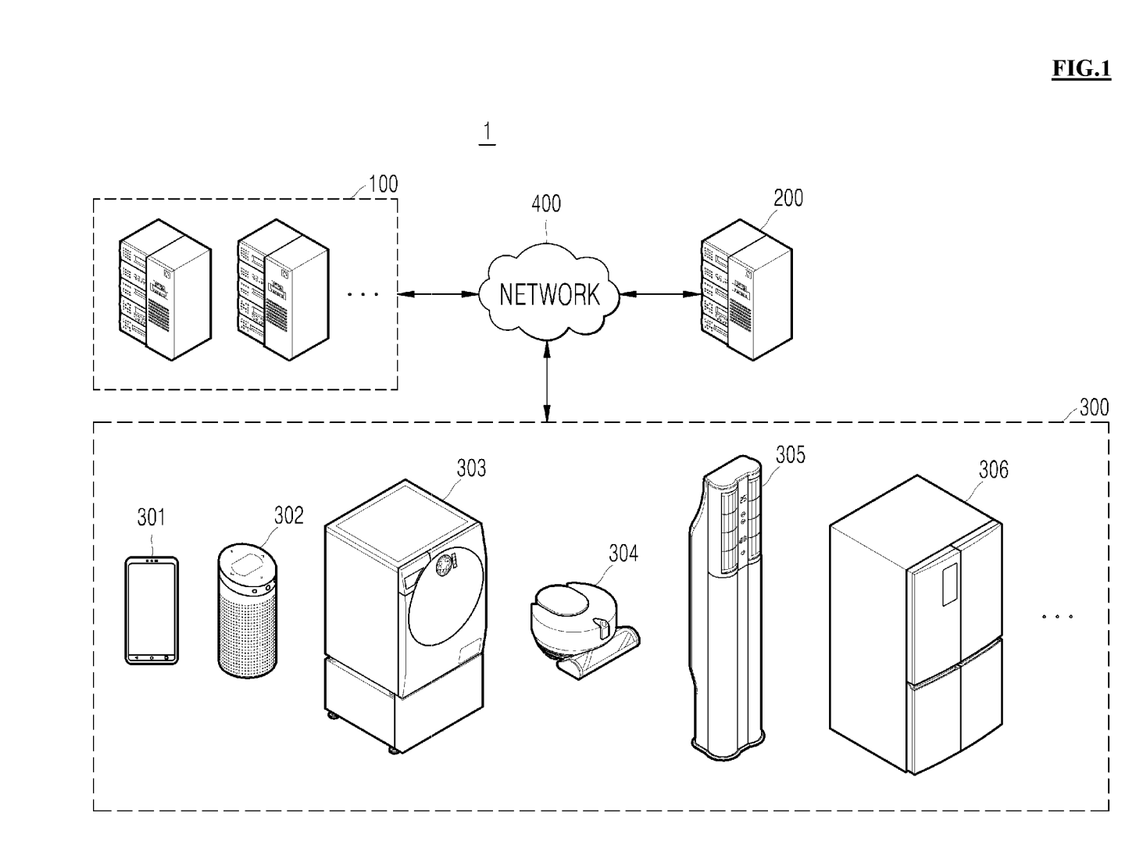
FIG. 1 is a diagram of speech recognition environment including a speech recognition system, a speech recognition service domain, and a network connecting these to each other, according to an embodiment of the present disclosure

FIG. 1 is a diagram of speech recognition environment (1) including a speech recognition system 100, a data mining device 200, various smart electronic devices 300, and a network 400 connecting these to each other, according to an embodiment of the present disclosure.

The speech recognition system 100 provides a speech recognition service for an electronic device 300 through a corresponding speech recognition service domain. The speech recognition system 100 may be composed of an additional server for each function in a process of recognizing an uttered speech of a person and answering through natural language processing. The speech recognition system 100 according to an embodiment of the present disclosure has a high dialect recognition performance.

The data mining device 200 preprocesses speech data including a dialect. A data analysis and refinement module 130 having a function similar to a function of the data mining device 200 is included in the speech recognition system 100, and the data analysis and refinement module 130 is independently implemented as the data mining device 200.

The various smart electronic devices 300 are electronic apparatuses that enable the user to use the speech recognition service through a corresponding domain. Examples of the smart electronic devices 300 include a terminal, such as a mobile communications terminal 301 of which the function is operable through speech, a speaker 302, a washing machine 303, a robot cleaner 304, an air conditioner 305, and a refrigerator 306.

The representative speech recognition service, provided through the mobile communications terminal 301, is an artificial intelligence (AI) secretary function performed by an application. The speaker 302, as an AI speaker, may serve as a hub controlling an electronic device without a speech input/output function. A speech input/output function is accommodated in each of the other electronic devices (household electrical appliances 303 to 306), thereby enabling the user to control an electronic product using a speech interface. In this regard, the electronic devices 300 are referred to as smart electronic devices.

The network 400 may be any appropriate communications network including wired and wireless networks, for example, a local area network (LAN), a wide area network (WAN), the Internet, an intranet, and an extranet, mobile networks, for example, cellular, third generation (3G), fourth generation (4G), long term evolution (LTE), fifth generation (5G), a wireless fidelity (WiFi) network, and an ad-hoc network, and combinations thereof.

The network 400 may include connection of network elements such as hubs, bridges, routers, switches, and gateways. The network 400 may include one or more connected networks, including a public network such as the Internet, as well as a private network such as a secure corporate private network, for example, a multiple network environment. Access to the network 400 may be provided via one or more wired or wireless access networks.

The speech recognition system 100 according to an embodiment of the present disclosure may provide a speech recognition service for the electronic device 300, specifically a dialect recognition function with an improved performance, through each corresponding domain Alternatively, the speech recognition system 100 may collect speech of the user through a corresponding domain, for example, speech data including a dialect. In addition, the speech data including a dialect collected from each domain (that is, dialect speech data) may be used as data for learning, which enables learning of an acoustic model and a language model. In particular, various types of information on a corresponding domain, and region information of the electronic device 300, may be used to guide collection of dialect speech data by region.

In detail, the speech recognition system 100 may collect dialect speech data having features which differ by domain or region. Through a network access address of the smart electronic device 300 transmitting dialect speech data to a server of the speech recognition system 100, or through hardware information, a region in which the corresponding smart electronic device 300 is located may be identified. Thus, pieces of dialect speech data of different regions, such as Gyeonggi Province, Jeolla Province, Gyeongsang Province, Chungcheong Province, Gangwon Province, and Jeju Island, are sorted by region and collected. Hereinafter, the speech recognition system 100 according to an embodiment of the present disclosure will be described in detail.

Figure 2:
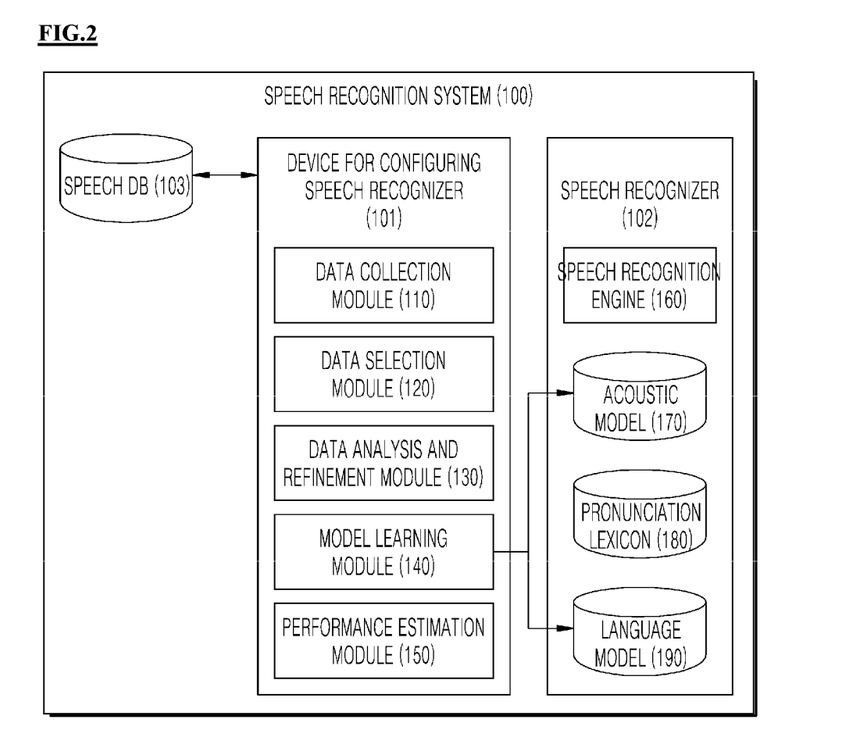
FIG. 2 is a schematic block diagram of a speech recognition system according to an embodiment of the present disclosure.

FIG. 2 is a schematic block diagram of a speech recognition system 100 according to an embodiment of the present disclosure.

Referring to FIG. 2, the speech recognition system 100 is configured to include a device for configuring a speech recognizer 101, a speech recognizer 102, and a speech database 103.

The device for configuring a speech recognizer 101 selects speech data, analyzes and refines the selected speech data through data mining, learns a model using the refined speech data, and goes through a performance estimation process of the model to finally learn an acoustic model 170 and a language model 190, and thereby updates a dialect recognition performance of the acoustic model and the language model. The device for configuring a speech recognizer 101 may be configured to include a data collection module 110, a data selection module 120, a data analysis and refinement module 130, a model learning module 140, and a performance estimation module 150. Here, the data analysis and refinement module 130 may be implemented as a single independent device, that is, a data mining device according to an embodiment of the present disclosure.

The data collection module 110 may collect regional dialect speech data from the speech database 103. Dialects of respective regions, inputted through the smart electronic device 300 of FIG. 1, are classified according to domain and regional group, collected by the data collection module 110, and stored in the speech database 103.

The data selection module 120 selects data from the speech database 103 stored in the speech recognition system 100, and uses a speech recognition result and information such as a lattice. The data selection module 120 selects data from the collected data using an abnormal vocalization classifier, excluding data which cannot be used for learning, such as sounds other than speech, speech between multiple speakers, and misrecognized speech.

The meaning of the selected speech data is automatically interpreted. The automatic interpretation of the meaning is referred to as auto-transcription. In the case of auto-transcription, a reliability is measured for an auto-transcription result in order to prevent possible errors from occurring, and data may be classified according to the reliability.

In this case, data with a high degree of reliability and data with a low degree of reliability may be provided. The data with a low degree of reliability may include dialect speech data. Thus, data with a low degree of reliability may be selected from the collected data, and through accent analysis, speech data including a dialect may be selected. Through the accent analysis, data other than dialect speech in the data with a low degree of reliability, such as slang, shortened words, and the like, may be removed. Transcription data is extracted from the selected dialect speech data and is then stored.

The data analysis and refinement module 130 is a module for processing raw data in order to generate data for learning, which enables learning of an acoustic model and a language model. That is, the data analysis and refinement module 130 is a module for performing data mining.

Figure 3:
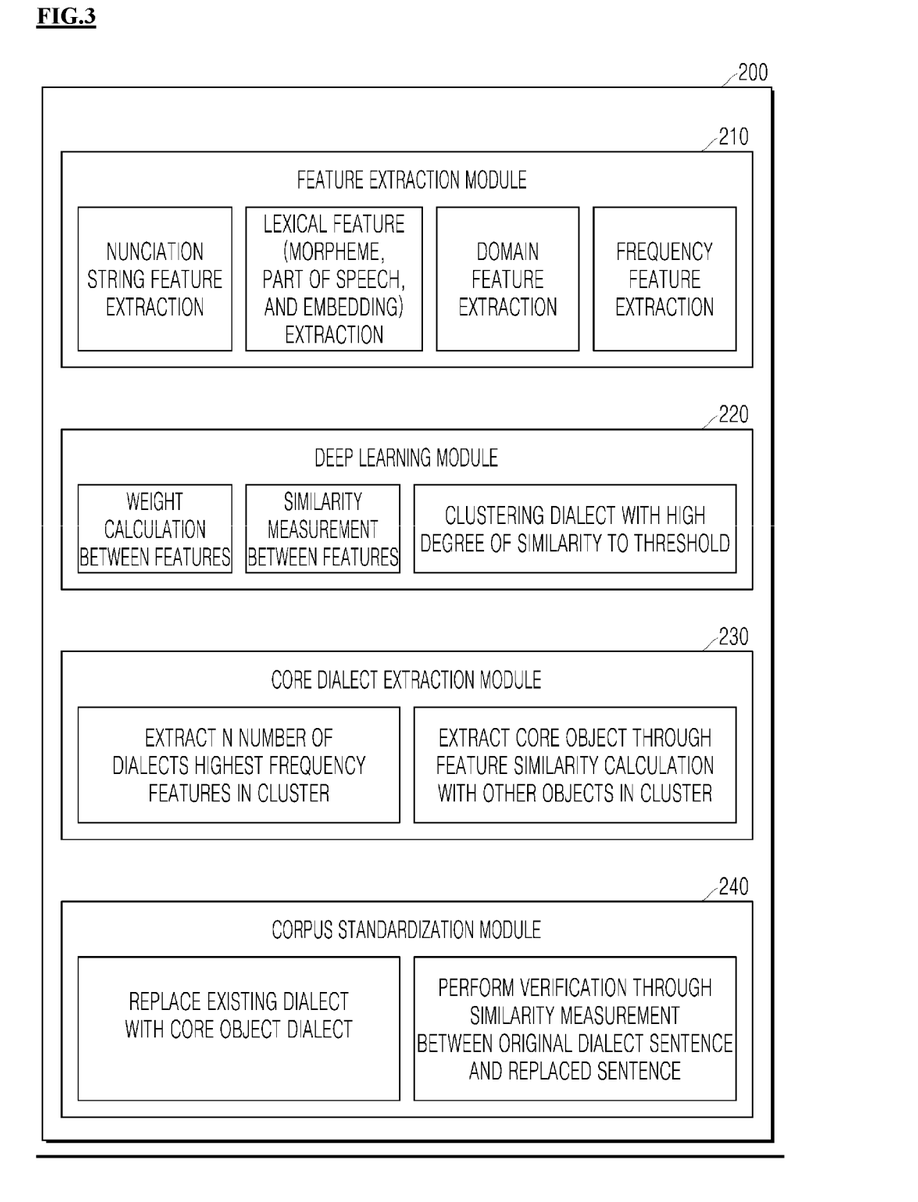
FIG. 3 is a schematic block diagram of a data mining device according to an embodiment of the present disclosure.

FIG. 3 is a schematic block diagram of a data mining device according to an embodiment of the present disclosure.

Referring to FIG. 3, components of a data mining device 200 according to an embodiment of the present disclosure are illustrated. The data mining device 200 may be configured as an independent device including the data analysis and refinement module 130 of FIG. 2.

The data mining device 200 is configured to include a feature extraction module 210, a deep learning module 220, a core dialect extraction module 230, and a corpus standardization module 240.

The feature extraction module 210 may extract at least one feature among pronunciation string features, lexical features (that is, morpheme, part of speech, and embedding features), domain features, and frequency features of speech data, particularly, dialect speech data. Here, the pronunciation string features and the lexical features correspond to linguistic features of a dialect.

The domain features correspond to features external to language, related to generation of dialect speech. As described with reference to FIG. 1, dialect speech is collected through a speech recognition service domain, and is analyzed and refined. The domain features may include information on an electronic device 300 through which the corresponding speech recognition service is provided, information on a region in which the electronic device 300 is distributed, and information on an age group of the user of the electronic device 300. Thus, through the domain features, speech data may be classified, according to the dialect used in a corresponding region.

The deep learning module 220 calculates the weight between features, measures a degree of similarity between features, and performs clustering on a dialect having a high degree of similarity to a threshold.

The core dialect extraction module 230 extracts n number of instances of dialect speech having the highest frequency features in a cluster, and extracts a core object through a feature similarity calculation with other objects in the cluster.

The corpus standardization module 240 replaces an existing dialect with a core object dialect, and verifies a standardization operation through a similarity measurement between an original dialect sentence and a replaced sentence.

In the case of a dialect of a region, for example, Gyeongsang Province or Jeolla Province, dialect words which due to variation have various forms but have the same meaning may be derived from a single dialect word. In this case, similar dialect words should be classified together. Classification of similar dialect words having the same meaning is referred to as clustering.

A core dialect word is extracted from a group in which dialect words in various forms but having the same meaning are clustered, and the core dialect word is used to standardize a corpus of dialect words.

The model learning module 140 generates an acoustic model 170 and a language model 190, and learns the generated acoustic model 170 and the generated language model 190 using refined data. In an embodiment of the present disclosure, an unsupervised learning method using deep learning may be performed.

A performance estimation module 150 may estimate a dialect recognition performance through a reliability measurement of a speech recognition result, performed by a speech recognition engine 160 using the learned acoustic model 170 and the learned language model 190. In addition, the performance estimation module 150 compares a previous speech recognizer with a new speech recognizer for which a reliability has been estimated. Here, when it is determined that a speech recognition performance by a new acoustic model 170 and a new language model 190 is improved, the acoustic model 170 and the language model 190 of a speech recognizer are updated to include newly learned contents.

Hereinafter, a process, in which the speech recognizer 102 in the speech recognition system 100 recognizes speech, inputted using the acoustic model 170, a pronunciation lexicon 180, and the language model 190, which are updated by the device for configuring a speech recognizer 101, will be described.

Figure 4:
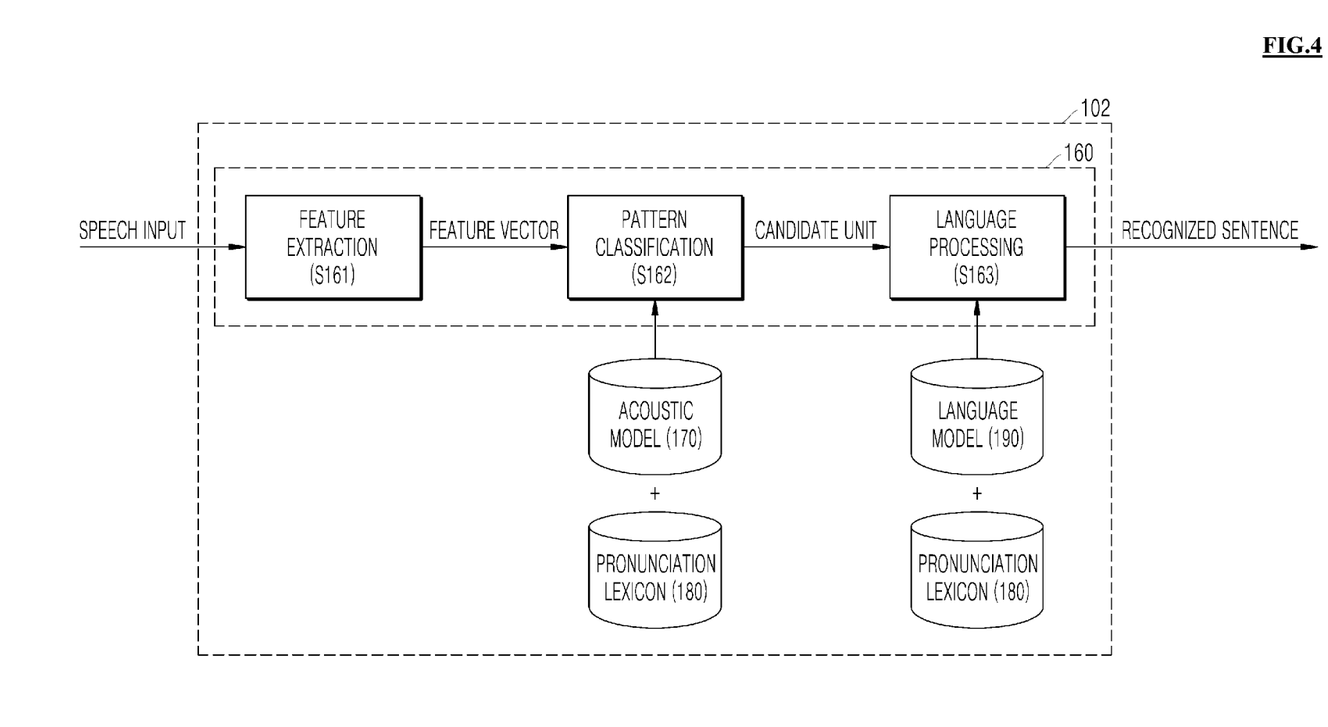
FIG. 4 is a schematic block diagram of a speech recognizer according to an embodiment of the present disclosure.

FIG. 4 is a schematic block diagram of a speech recognizer according to an embodiment of the present disclosure.

Referring to FIG. 4, a speech recognizer 102 according to an embodiment of the present disclosure is illustrated. The speech recognizer 102 is configured to include a speech recognition engine 160, an acoustic model 170, a pronunciation lexicon 180, and a language model 190.

Uttered speech is converted into a speech signal through a microphone, and the analog speech signal is converted into a digital speech signal through a digital sampling process. The digital speech signal is subjected to acoustic signal processing. Here, the acoustic signal processing may include spectral analysis.

Dialect speech is inputted through the smart electronic device 300 (for example, an AI speaker) and the inputted speech is converted into an electrical signal, and the converted analog signal is again converted into a digital electrical signal through sampling. The speech recognition engine 160 extracts features of the speech, that is, a feature vector, from the digital electrical signal (S161). Thereafter, the speech recognition engine 160 generates a candidate unit through a pattern classification process (S162) using the acoustic model 170 and the pronunciation lexicon 180 based on the extracted feature vector, and outputs a sentence finally recognized through a language processing process (S163) using the pronunciation lexicon 180 and the language model 190.

Even when the same language is used, speech not only varies in significantly complicated ways depending on factors such as the gender, age, and state during pronunciation of the person uttering the speech, but the character of the speech also varies depending on whether the speech is uttered alone or within a word or a sentence. Thus, it is important to detect features with a high degree of distinction between features of the speech. That is, in a feature extracting process, unnecessarily duplicated speech information should be removed, while information that increases consistency between the same speech signals and increasing a distinction with other speech signals is extracted. The information is referred to as a feature vector.

The feature extraction is a process for extracting a component useful for recognition from a speech signal. Feature extraction is generally related to compression and dimension reduction of information. Since there is no ideal method for feature extraction, a speech recognition rate is used to determine the degree of quality of the features for speech recognition. The main research fields regarding feature extraction are an expression of a feature reflecting a human auditory feature, an extraction of a feature robust to various noise environments/speakers/channel changes, and an extraction of a feature expressing a change of time.

Feature extraction techniques mainly used for speech recognition are a linear predictive coefficient, cepstrum, a mel-frequency cepstral coefficient (MFCC), and a filter bank energy.

A speech recognition process is divided into an offline learning stage for generating a recognition network model from speech data and language data, and an online searching stage for recognizing speech uttered by the user.

The speech recognition engine 160 outputs character information from a speech signal using prior knowledge in the form of speech and language information. In this case, a speech recognition algorithm may be referred to as a decoder, in that a speech signal is interpreted as character symbols.

The feature vector, obtained in the feature extraction, is subjected to a similarity measurement and a recognition process. For the similarity measurement and the recognition, an acoustic model for modeling and comparing signal characteristics of speech, and a language model for modeling the linguistic order relation such as a word or a syllable corresponding to a recognized word, are used.

The acoustic model is again divided into a direct comparison method and a statistical method. In the direct comparison method, a recognition target is set as a feature vector model, and the feature vector model is compared with a feature vector of an input signal. In the statistical method, feature vectors of a recognition target are statistically processed and used. In the direct comparison method, a unit such as a word or a phoneme, provided as a recognition target, is set as a feature vector model, and inputted speech is compared with the feature vector model to obtain a degree of similarity therebetween. The representative direct comparison method is a method using vector quantization. Here, the previously obtained feature vector or coefficients are mapped to a codebook, which is an existing model, and encoded into a representative value, and code values are thereby compared with each other. In the statistical method, a unit for a recognition target is provided as a state sequence, and the relationship between state sequences is used. The state sequence can construct a complex model, and thus this technique is used for most speech recognition, excluding simple word recognition. The method using the relationship between state sequences is again divided into a method using a temporal arrangement relationship such as dynamic time warping (DTW), a statistical method such as hidden Markov modeling (HMM) in which the probability, mean, and variance are provided as comparison targets, and a method using an artificial neural network.

In the decoding, by using the acoustic model (AM), the language model (LM), and the pronunciation lexicon, resulting from the learning stage, the inputted feature vector is compared with a model and scored, and a word sequence is ultimately determined.

The speech database 103 may be configured to include regional dialect speech data, collected by various smart electronic devices 300 through a domain providing the speech recognition service illustrated in FIG. 1, and public speech data collected by national institutions or research institutes. In addition, the speech database 103 may include big data.

Hereinafter, a speech recognition method, performed by the speech recognition system 100, particularly, the device for configuring a speech recognizer 101, will be described in detail.

Figure 5:
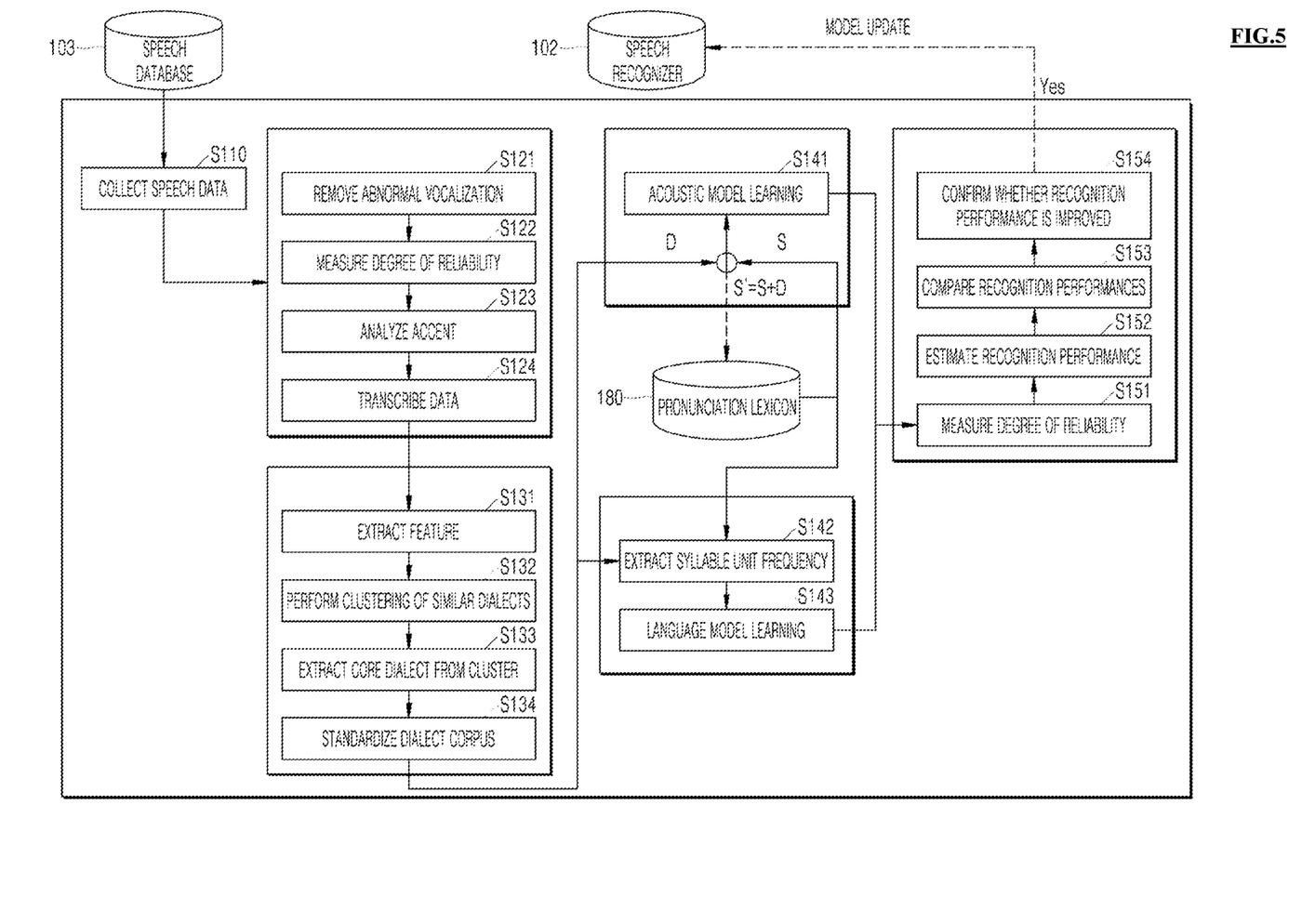
FIG. 5 is a schematic flow diagram of a speech recognition method performed by a device for configuring a speech recognizer according to an embodiment of the present disclosure.

FIG. 5 is a schematic flow diagram of a speech recognition method performed by a device for configuring a speech recognizer according to an embodiment of the present disclosure.

Referring to FIG. 5, a speech recognition method (S100) according to an embodiment of the present disclosure includes configuring a speech recognizer 102 suitable for dialect speech recognition, and actually performing speech recognition of inputted speech using the speech recognizer 102.

In the speech recognition method (S100) according to an embodiment of the present disclosure, the configuring a speech recognizer 102 includes, as a main process, updating an acoustic model and a language model required for dialect speech recognition.

A speech recognition system 100 according to an embodiment of the present disclosure performs the following operations in order to improve a dialect speech recognition performance.

First, the speech recognition system 100 collects data through a data collection module 110 (S110).

Then, the speech recognition system 100 selects speech data including a dialect from speech data, through the data selection module 120 (S120).

S120 includes removing an abnormal vocalization (S121), measuring a degree of reliability of the speech data (S122), analyzing an accent of the speech data (S123), and transcribing the speech data (S124), internally.

Then, the speech recognition system 100 analyzes and refines the speech data including a dialect, through a data analysis and refinement module 130 (S130).

S130 includes extracting features of dialect speech (S131), performing clustering of similar dialect (S132), extracting core dialect from a cluster (S133), and standardizing a dialect corpus (S134), internally.

Then, the speech recognition system 100 generates an acoustic model and a language model through the model learning module 140, and learns the acoustic model and the language model using data for learning (S140).

S140 includes generating an acoustic model and learning the acoustic model (S141), extracting a syllable unit frequency (S142), and learning the language model (S143), internally. Here, a pronunciation lexicon 180 may also be used in the learning of the acoustic model and the language model. Through the learning, the performance of the acoustic model and the language model for standard dialect and dialect speech is improved.

Finally, the speech recognition system 100 estimates the performance of the learned acoustic model 170 and the learned language model 190, through a performance estimation module 150 (S150).

S150 includes measuring a degree of reliability with respect to at least one model (S151), estimating a recognition performance using the degree of reliability (S152), comparing recognition performances between a plurality of models (S153), and confirming whether a recognition performance is improved by comparing a model with a better recognition performance, among the plurality of models, with a previous model (S154), internally. S150 may be performed on the acoustic model and the language model.

Figure 6:
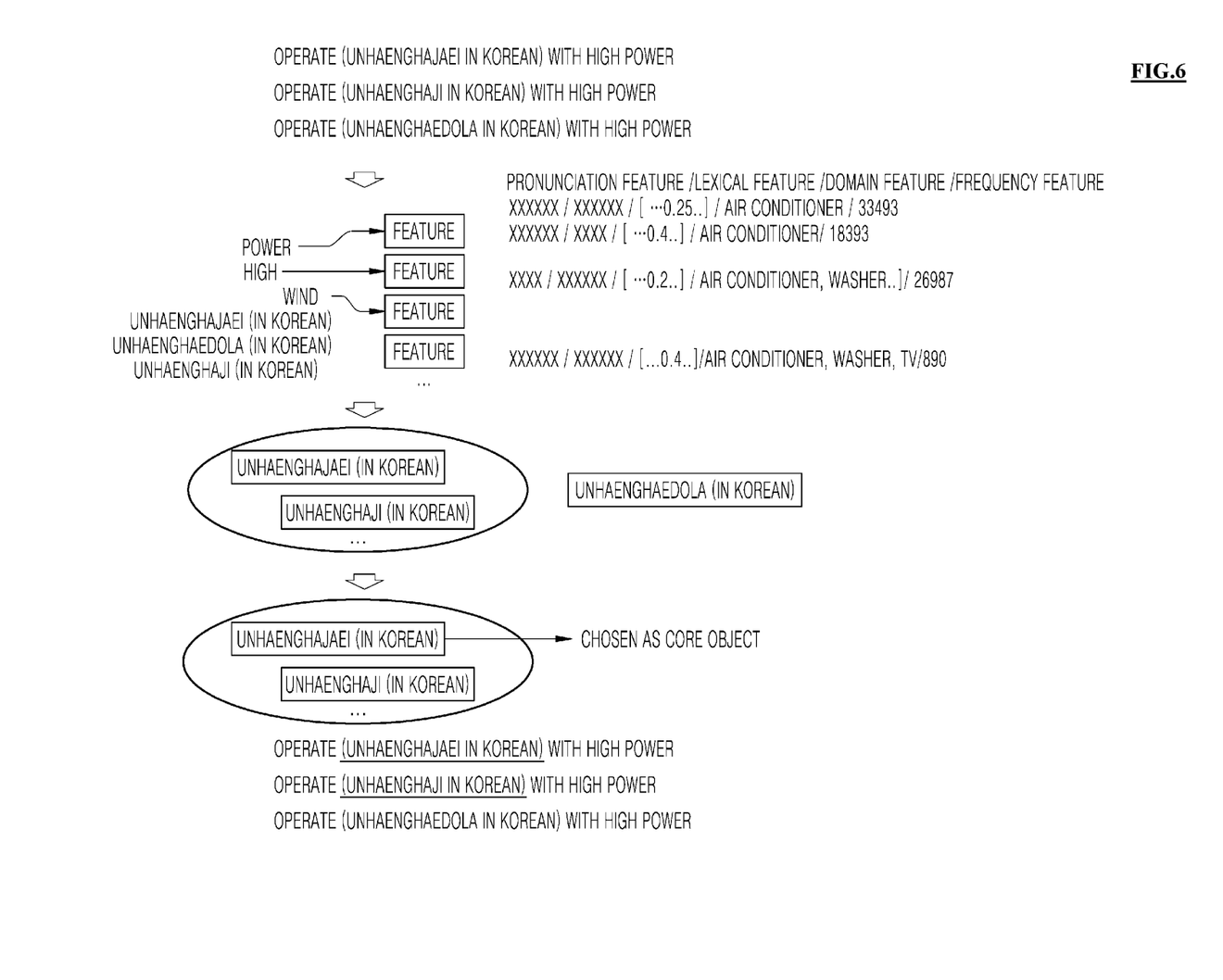
FIG. 6 is a view illustrating an example of analyzing and refining of data performed by a data mining device according to an embodiment of the present disclosure.

FIG. 6 is a view illustrating analyzing and refining of data, performed by a data mining device according to an embodiment of the present disclosure.

Referring to FIG. 6, an example of S131 to S134 of FIG. 5 for data analysis and refinement, among operations constituting a speech recognition method according to an embodiment of the present disclosure, is illustrated. As dialect sentences used for analysis and refinement of speech data, having the same meaning but different forms, a first sentence "Operate (unhaenghajaei in Korean) with high power", a second sentence "Operate (unhaenghaji in Korean) with high power", and a third sentence "Operate (unhaenghaedola in Korean) with high power" are selected as example sentences.

A feature extraction module 210 extracts features with respect to pronunciation string features, lexical features, domain features, and frequency features of each of the first sentence to the third sentence (S131). As examples of the domain features, a domain such as an air conditioner or a washing machine is illustrated.

Thereafter, a deep learning module 220 performs similar dialect clustering using an unsupervised method (S132). In the dialect sentences, a clustering result for the predicates thereof is illustrated. In the first sentence to the third sentence, "unhaenghajaei" and "unhaenghaji" are clustered together, while "unhaenghaedola" is not included in the same cluster.

Then, a core dialect extraction module 230 extracts dialect with high frequency features, and extracts core dialect speech through a similarity calculation (S133). Between the predicate of the first sentence and the predicate of the second sentence, "unhaenghajaei" has higher frequency features compared to "unhaenghaji". Through the similarity calculation, "unhaenghajaei" is chosen as a core object.

Then, a corpus standardization module 240 replaces an existing dialect with a core object dialect, and verifies corpus standardization through a similarity measurement between an original dialect sentence and a replaced sentence. Of the first to third sentences, the predicate of the second sentence, "unhaenghaji" is replaced with the core object, "unhaenghajaei".

If the entire lexicon of a dialect, in which various forms are derived by various variations, is provided as a speech recognition target, a recognition rate may decrease, and a dialect recognition speed may decrease. Thus, through standardization of a dialect corpus, both a recognition rate of a dialect and a dialect recognition speed increases.

As described above, according to an embodiment of the present disclosure, a performance of a speech recognition system recognizing speech including a dialect may be improved.

In addition, by enabling speech including a dialect to be recognized as it is, without conversion into a standard dialect, natural language processing of language using a dialect may be performed.

In addition, by using artificial intelligence for data mining, data refining may be performed using a semi-automatic method.

In addition, through standardization of a corpus including a dialect, the time consumed in dialect recognition may be reduced.

Many modifications to the above embodiments may be made without altering the nature of the invention. The dimensions and shapes of the components and the construction materials may be modified for particular circumstances. While various embodiments have been described above, it should be understood that they have been presented by way of example only, and not as limitations.

The invention claimed is:

1. A speech recognition method comprising:
selecting speech data including a dialect from speech data;
analyzing and refining the speech data including the dialect; and
learning an acoustic model and a language model using the refined speech data including the dialect,
wherein the analyzing and refining the speech data including the dialect comprises:
extracting features from the speech data including the dialect;
performing similar dialect word clustering on the speech data including the dialect using the extracted features to form a similar dialect word cluster;
extracting a core dialect word from the similar dialect word cluster; and
standardizing a dialect corpus using the extracted core dialect word.

2. The speech recognition method of claim 1, further comprising collecting speech data.

3. The speech recognition method of claim 2, wherein, in the collecting speech data, speech data of users is collected through the users in a region in which different types of dialects are used, and through various types of speech recognition service domains.

4. The speech recognition method of claim 1, wherein the selecting speech data including a dialect from speech data comprises:
removing an abnormal vocalization from the speech data;
adopting the speech data including the dialect using a reliability measurement of the speech data; and
obtaining transcription data from the speech data including the dialect.

5. The speech recognition method of claim 1, wherein, in the extracting features from the speech data including the dialect, at least one among pronunciation string features, lexical features, domain features, and frequency features of dialect speech is extracted.

6. The speech recognition method of claim 5, wherein the domain features comprise information on a type of an electronic apparatus providing a speech recognition service for the user, information on a region in which the electronic apparatus is located, and information on an age group of the user of the electronic apparatus.

7. The speech recognition method of claim 1, wherein, in the performing similar dialect word clustering, a degree of similarity between features is measured through weight calculation between features according to an unsupervised learning method, and a dialect word having a high degree of similarity to a threshold is clustered.

8. The speech recognition method of claim 1, wherein, in the extracting the core dialect word from the similar dialect word cluster, n number of objects having the highest frequency features in a cluster are extracted, and a core object is extracted through a feature similarity calculation with other objects in the cluster.

9. The speech recognition method of claim 1, wherein, in the standardizing the dialect corpus, an existing dialect word is replaced with a core object dialect word, and verification is performed through a similarity measurement between an original dialect sentence and a replaced sentence.

10. A data mining device for processing speech data including a dialect, comprising:
a memory storing one or more instructions; and
one or more processors configured to execute the one or more instructions to:
extract features from the speech data including the dialect;
perform similar dialect word clustering on the speech data including the dialect using the extracted features to form a similar dialect word cluster;
extract a core dialect word from the similar dialect word cluster; and
standardize a dialect corpus using the extracted core dialect word.

11. The data mining device of claim 10, wherein the one or more processors are further configured to extract at least one among pronunciation string features, lexical features, domain features, and frequency features of dialect speech.

12. The data mining device of claim 11, wherein the domain features comprise information on a type of an electronic apparatus providing a speech recognition service for the user, information on a region in which the electronic apparatus is located, and information on an age group of the user of the electronic apparatus.

13. The data mining device of claim 10, wherein the one or more processors are further configured to measure a degree of similarity between features through weight calculation between features according to an unsupervised learning method, and cluster a dialect word having a high degree of similarity to a threshold.

14. The data mining device of claim 10, wherein the one or more processors are further configured to extract n number of objects having the highest frequency features in a cluster, and extract a core object through a feature similarity calculation with other objects in the cluster.

15. The data mining device of claim 10, wherein the one or more processors are further configured to replace an existing dialect word with a core object dialect word, and perform verification through a similarity measurement between an original dialect sentence and a replaced sentence.

16. A speech recognition system comprising:
a memory storing one or more instructions; and
one or more processors configured to execute the one or more instructions to:
collect speech data;
select speech data including a dialect from the collected speech data;
analyze and refine the speech data including the dialect; and
learn an acoustic model and a language model using the refined speech data including the dialect,
wherein the speech recognition system further comprises:
a speech recognition engine recognizing speech using the learned acoustic model and the learned language model,
wherein the one or more processors are further configured to:
extract features from the speech data including the dialect;
perform similar dialect word clustering on the speech data including the dialect using the extracted features to form a similar dialect word cluster;
extract a core dialect word from the similar dialect word cluster; and
standardize a dialect corpus using the extracted core dialect word.

* * * * *